United States Patent [19]

Pattee

[11] Patent Number: 4,779,407
[45] Date of Patent: Oct. 25, 1988

[54] ROTATABLE MEMBER, REPLACEABLE COMPONENTS THEREFOR, AND METHODS OF CONSTRUCTING AND UTILIZING SAME

[76] Inventor: John G. Pattee, 22435 Clarkshire, South Lyon, Mich. 48178

[21] Appl. No.: 933,381

[22] Filed: Nov. 21, 1986

[51] Int. Cl.⁴ .................. A01D 34/73; A01D 34/67
[52] U.S. Cl. ............................................ 56/295
[58] Field of Search ................................. 56/295

[56] References Cited

U.S. PATENT DOCUMENTS

| | | | |
|---|---|---|---|
| 2,869,311 | 1/1959 | Beeston, Jr. | 56/295 |
| 3,080,697 | 3/1963 | Mauro | 56/295 |
| 3,097,468 | 7/1963 | Johnson | 56/295 |
| 3,452,524 | 7/1969 | Guigtterman | 56/295 |
| 3,564,824 | 2/1971 | Tygh, Jr. | 56/295 |
| 3,975,891 | 8/1976 | Gunther | 56/295 |
| 4,214,426 | 7/1980 | Lindbled | 56/295 |
| 4,306,407 | 12/1981 | Dambroth | 56/295 |
| 4,445,315 | 5/1984 | Roszkowski | 56/295 |
| 4,651,510 | 3/1987 | Malvtich | 56/295 |

Primary Examiner—Paul J. Hirsch
Attorney, Agent, or Firm—Irving M. Weiner; Pamela S. Burt; Roland W. Norris

[57] ABSTRACT

A rotary lawn mower bar with non-metallic replaceable cutting and sweeping components. The rotary bar has L-shaped retaining arms each of which passes through a central channel in a replaceable component. The replaceable components can either cut vegetation, or can be used for blowing or sweeping purposes.

8 Claims, 1 Drawing Sheet

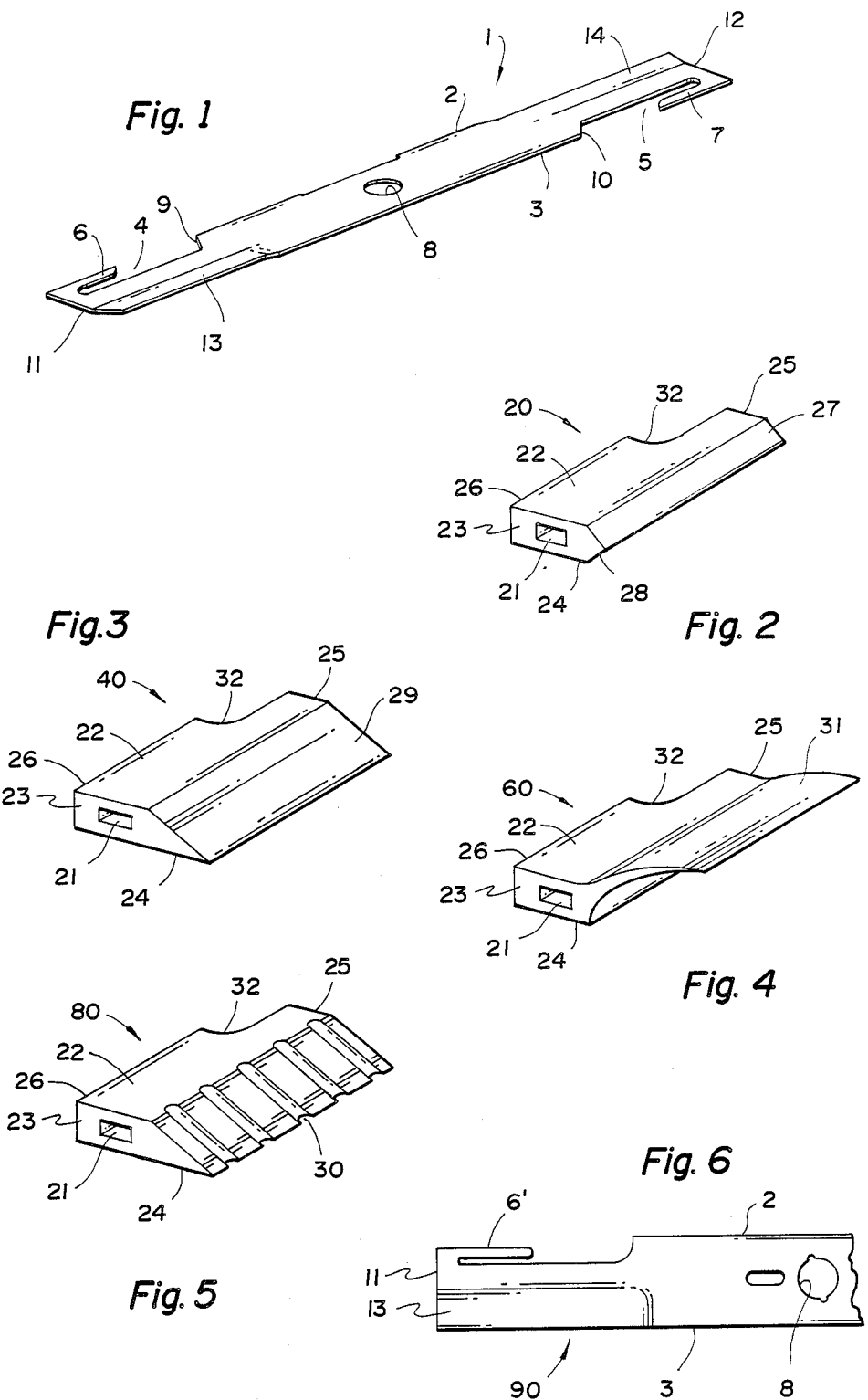

4,779,407

ROTATABLE MEMBER, REPLACEABLE COMPONENTS THEREFOR, AND METHODS OF CONSTRUCTING AND UTILIZING SAME

BACKGROUND OF THE INVENTION

1. Field of the Invention

The present invention relates generally to a rotatable member and replaceable components therefor, and methods of constructing and utilizing same. More particularly, the present invention relates to a mower blade and replaceable cutter inserts therefor, and to methods of constructing and utilizing the same.

2. Description of Relevant Art

Beeston, Jr. U.S. Pat. No. 2,869,311, entitled "BLADE FOR ROTARY LAWN MOWER", discloses a bar which has an arm that extends beyond the leading edge of the bar. A blade holder is slidably disposed on the retaining arm, and thereafter a cutting blade is removably mounted in the blade holder.

Beeston, Jr. U.S. Pat. No. 2,924,059, entitled "ROTARY LAWN MOWER BLADE", discloses a blade holder including a U-shaped end portion defining a blade supporting clip member.

Johnson U.S. Pat. No. 3,097,468, entitled "GRASS CUTTER BAR", discloses a grass cutter bar having tubular receptacles at its opposite ends for accommodating insertable cutter elements.

There were, and still are, a plethora of problems attendant the prior art structures prior to the advent of the present invention.

SUMMARY OF THE INVENTION

The present invention provides a rotatable member and a replaceable component therefor, including a rotatable member having a major elongated longitudinal edge. The rotatable member has an integral component-retaining arm which does not extend beyond the major elongated longitudinal edge relative to the major central longitudinal axis of the rotatable member. A replaceable component, such as a cutter blade, for example, is slidably disposed on the integral component-retaining arm for rotating with the rotatable member.

One purpose of the present invention is to provide replaceable components, such as grass cutting blades, weed cutting blades, and air blow off sweeper blades, which are fabricated from plastic and thus will not rust.

Another object or purpose of the invention is to provide replaceable components which can be fabricated in a simple fashion, thereby avoiding complicated casting or injection molding manufacturing operations.

Yet another object of the present invention is to provide replaceable components which can be fabricated in long sections and simply cut to size, and wherein such components do not require any taper or any head buttons.

A further object of the invention is to provide replaceable components and a special design for the rotatable member which ensures that the replaceable component will be located at the end of the rotatable member during each use. The prior art blades will normally not be located at the end of the rotatable bar because of entrapped dirt and/or improper design of the blade and bar.

A further object of the invention is to provide replaceable components for a rotary lawn mower blade, wherein such components have a straight through opening therethrough from which any dirt may be easily punched out.

A further understanding of the present invention, as well as other objects, purposes and advantages thereof, will become apparent from a reading of the following description and the drawings which depict some illustrative embodiments of the invention.

BRIEF DESCRIPTION OF THE DRAWINGS

FIG. 1 illustrates a perspective view of a rotary mower bar according to a first embodiment of the present invention.

FIG. 2 depicts a replaceable weed cutter blade.

FIG. 3 shows a grass cutter blade according to the present invention.

FIG. 4 shows a replaceable air blow off sweeper blade according to the invention.

FIG. 5 illustrates a serrated grass blade according to the invention.

FIG. 6 depicts a portion of a modified rotary mower bar in accordance with a second embodiment of the present invention.

DETAILED DESCRIPTION OF SOME PREFERRED EMBODIMENTS

It will be understood that the phraseology and terminology employed herein is for the purpose of description and not for limitation, and that modifications and changes in construction and arrangement of this invention can be made within the scope of what is claimed, without departing from the spirit and purpose thereof. It is thus intended to cover by the claims, any modified forms of structure or mechanical equivalents which may be reasonably included within their scope.

Because many embodiments may utilize the inventive concept, and because many modifications may be made in each such embodiment (only a few of which are described herein), it will be understood that all matter herein is to be interpreted merely as illustrative, and not in a limiting sense.

Similar reference numerals refer to similar parts throughout these several views of the drawings.

With reference to FIG. 1, there is shown a novel rotatable member, such as rotary mower bar 1, which may, for example, be affixed to a conventional rotary lawn mower (not shown). The bar 1 is provided with major elongated longitudinal edges 2 and 3 which are disposed parallel to the major central longitudinal axis of the bar 1.

The bar 1 is provided with specially designed and dimensioned notches 4 and 5 with associated specially designed and dimensioned retaining arms 6 and 7, respectively.

The bar 1 is provided with a centrally located opening 8 for its reception on a power-providing rotary shaft (not shown) of a lawn mower.

Each notch 4, 5 is provided with a cutout edge 9 and 10, respectively, which is disposed at a predetermined angle with respect to elongated edges 2 and 3, respectively, to accommodate and facilitate easy mounting and removal of various replaceable components, such as those shown in FIGS. 2-5. In a preferred embodiment of the present invention, each cutout edge 9, 10 is disposed at an angle of approximately 60° with respect to its associated longitudinal edge 2, 3, respectively.

The bar 1 is also provided with remote transverse edges 11 and 12, and slightly raised portions 13 and 14.

To facilitate the manufacturing process, in the embodiment shown in FIG. 1 the edge of retaining arm 6 which is remote from the major central longitudinal axis of bar 1 is colinear with edge 2. In a similar fashion, the edge of retaining arm 7 which is remote from the major central longitudinal axis of bar 1 is colinear with edge 3.

FIG. 2 shows a replaceable cutter blade 20 according to the present invention, which may be used for various cutting purposes, but which is particularly adaptable for cutting weeds. The blade 20 is provided with a straight through opening or channel 21 therethrough which is dimensioned and configured to mate with arm 6 or 7. The blade 20 is provided with orthogonally-arranged surfaces 22, 23, 24, 25 and 26 similar to an arrangement in a rectangular parallelepiped. The forward portion of blade 20 is formed by two predetermined blade surfaces 27 and 28. Blade surfaces 27 and 28 may be arranged in any desired predetermined angular relationship. However, in the particular embodiment illustrated in FIG. 2 blade surfaces 27 and 28 are oriented at substantially 45° relative to surfaces 22 and 24, respectively. Component 20 functions best as a weed blade.

It is important to note that component 20 (as well as components 40, 60 and 80 described hereinbelow) is provided with a novel arcuate cut-out portion 32 which facilitates placement of component 20 on arm 6 so that surface 25 can be disposed substantially coplanar with edge 11 or 12.

The replaceable component 40 shown in FIG. 3 functions best as a grass cutting blade. Preferably, but not necessarily, the blade surface 29 forms a predetermined angle relative to surface 24 which preferably is approximately 40°.

FIG. 5 shows an alternate embodiment for the replaceable component 40 shown in FIG. 3. The blade 80 is similar to blade 40 in every respect except for the serrations 30 formed in the cutting surface.

FIG. 4 illustrates a replaceable component 60 which functions as an air blow off sweeper blade. Component 60 is provided with a specially shaped fin element 31 which provides the air blow off sweeper action. Component 60 functions to blow off debris and grass cuttings.

FIG. 6 illustrates a fragmentary view of a rotary mower bar 90 which is similar to the rotary mower bar 1 illustrated in FIG. 1 except for the set back nature of the retaining arms. In particular, as shown in FIG. 6, the forward edge of retainer arm 6' is not colinear with the elongated longitudinal edge 2. The forward edge of retaining arm 6' is set back to be closer to the major central longitudinal axis of the mower bar 90. However, when a replaceable component, such as for example blade 20, is placed on mower bar 90, the forward cutting edge of blade 20 is substantially colinear with edge 2.

According to the present invention, the replaceable components are non-metallic, and consequently will not rust or corrode. Preferably, but not necessarily, the replaceable components can be fabricated from hard plastic.

Moreover, because of the straight nature of the channel or opening 21, any dirt which may get temporarily entrapped therein is easily dislodged therefrom.

I claim:
1. A rotatable member and a replaceable component therefor, comprising:
   a rotatable member having a major elongated longitudinal edge;
   said rotatable member having an integral component-retaining arm which does not extend beyond said major elongated longitudinal edge relative to the major central longitudinal axis of said rotatable member;
   said integral component-retaining arm being defined by a notch formed in an end portion of said rotatable member such that said integral component-retaining arm extends inwardly towards a central portion of said rotatable member;
   an integrally-molded elongated replaceable component slidably disposable on said integral component-retaining arm for rotating with said rotatable member;
   said replacement component including a main body portion and a working portion integral and unitary with said main body portion;
   said main body portion having a longitudinal throughchannel formed therein which is dimensioned and configured to mate with said integral component-retaining arm; and
   said main body portion of said replaceable component being provided with an arcuate cut-out corner portion which is disposed adjacent a remote transverse edge of said rotatable member when said replaceable component is slidably disposed on said integral component-retaining arm of said rotatable member.

2. A rotatable member and a replaceable component therefor according to claim 1, wherein:
   the major central longitudinal axis of said throughchannel in said replaceable component is oriented parallel to said major central longitudinal axis of said rotatable member when said replaceable component is disposed on said integral component-retaining arm of said rotatable member.

3. A rotatable member and a replaceable component therefor according to claim 1, wherein:
   said working portion of said replaceable element comprises a cutting portion, the leading edge of which is disposed parallel to said major central longitudinal axis of said rotatable member when said replaceable component is slidably disposed on said integral component-retaining arm of said rotatable member.

4. A rotatable member and a replaceable component therefor according to claim 2, wherein:
   said working portion of said replaceable element comprises a cutting portion, the leading edge of which is disposed parallel to said major central longitudinal axis of said rotatable member when said replaceable component is slidably disposed on said integral component-retaining arm of said rotatable member.

5. A rotatable member and a replaceable component therefor according to claim 1, wherein:
   said rotatable member is fabricated from a flat workpiece, and the resulting rotatable member has all its portions coplanar except for a slightly raised portion rearwardly of said component-retaining arm, said slightly raised portion facilitating the transport of cut vegetation.

6. A rotatable member and a replaceable component therefor according to claim 2, wherein:
   said rotatable member is fabricated from a flat workpiece, and the resulting rotatable member has all its portions coplanar except for a slightly raised portion rearwardly of said component-retaining arm, said slightly raised portion facilitating the transport of cut vegetation.

7. A rotatable member and a replaceable component therefor according to claim 3, wherein:
said rotatable member is fabricated from a flat workpiece, and the resulting rotatable member has all its portions coplanar except for a slightly raised portion rearwardly of said component-retaining arm, said slightly raised portion facilitating the transport of cut vegetation.

8. A rotatable member and replaceable component therefor according to claim 4, wherein:
said rotatable member is fabricated from a flat workpiece, and the resulting rotatable member has all its portions coplanar except for a slightly raised portion rearwardly of said component-retaining arm, said slightly raised portion facilitating the transport of cut vegetation.

* * * * *

UNITED STATES PATENT AND TRADEMARK OFFICE
CERTIFICATE OF CORRECTION

PATENT NO. : 4,779,407

DATED : October 25, 1988

INVENTOR(S) : John G. Pattee

It is certified that error appears in the above-identified patent and that said Letters Patent is hereby corrected as shown below:

Column 4, line 15 (claim 1, line 19), change "replacement" to
--replaceable--

Column 4, line 19 (claim 1, line 23), change "throughchannel" to
--through-channel--

Signed and Sealed this

Seventh Day of March, 1989

Attest:

DONALD J. QUIGG

Attesting Officer

Commissioner of Patents and Trademarks